US012671754B2

(12) United States Patent
Schueffny et al.

(10) Patent No.: US 12,671,754 B2
(45) Date of Patent: Jun. 30, 2026

(54) MULTI-MODE LINE DRIVER CIRCUIT FOR THE PHYSICAL LAYER OF A NETWORK CONNECTION, PARTICULARLY OF AN ETHERNET COMMUNICATION, SUPPORTING DIFFERENT SIGNAL LEVELS FOR DIFFERENT COMMUNICATION STANDARDS

(71) Applicant: SILICONALLY GMBH, Dresden (DE)

(72) Inventors: Franz Marcus Schueffny, Dresden (DE); Stefan Haenzsche, Dresden (DE); Sebastian Hoeppner, Dresden (DE); Martin Kreissig, Dresden (DE)

(73) Assignee: SILICONALLY GMBH, Dresden (DE)

( * ) Notice: Subject to any disclaimer, the term of this patent is extended or adjusted under 35 U.S.C. 154(b) by 622 days.

(21) Appl. No.: 18/245,655

(22) PCT Filed: Oct. 22, 2021

(86) PCT No.: PCT/EP2021/079422
§ 371 (c)(1),
(2) Date: Mar. 16, 2023

(87) PCT Pub. No.: WO2022/090093
PCT Pub. Date: May 5, 2022

(65) Prior Publication Data
US 2023/0362285 A1    Nov. 9, 2023

(30) Foreign Application Priority Data
Oct. 27, 2020    (EP) .................................... 20204078

(51) Int. Cl.
*H04L 69/323*        (2022.01)
*H04L 25/02*         (2006.01)
(Continued)

(52) U.S. Cl.
CPC ...... *H04L 69/323* (2013.01); *H04L 25/03828* (2013.01); *H04L 25/4917* (2013.01)

(58) Field of Classification Search
None
See application file for complete search history.

(56) References Cited

U.S. PATENT DOCUMENTS

| | | | |
|---|---|---|---|
| 6,665,347 B2 | 12/2003 | van Bavel et al. | |
| 6,867,618 B2 | 3/2005 | Li et al. | |
| | (Continued) | | |

FOREIGN PATENT DOCUMENTS

| | | | |
|---|---|---|---|
| EP | 3493497 A1 | 6/2019 | |

OTHER PUBLICATIONS

International Search Report and Written Opinion issued in PCT/EP2021/079422 mailed Oct. 22, 2021.
(Continued)

*Primary Examiner* — Anh Q Tran
(74) *Attorney, Agent, or Firm* — Nicholas Mesiti, Esq.; Heslin Rothenberg Farley & Mesiti P.C.

(57) ABSTRACT

A multi-mode line driver circuit supporting different communication standards includes an output for the network connection, and driver elements connected in parallel to the output. Each driver element is connected to a positive and negative supply voltage, and includes a resistor, a first switch and a second switch. The resistor is connected to the output and via the first switch to the positive supply voltage and via the second switch to the negative supply voltage. The driver circuit also includes at least one coding block with an input for a digital signal to be transmitted over the network connection. The coding block provides control signals for the first switch and the second switch for connecting the resistor of each driver element to the positive supply voltage or the negative supply voltage. The digital
(Continued)

Figure 1:
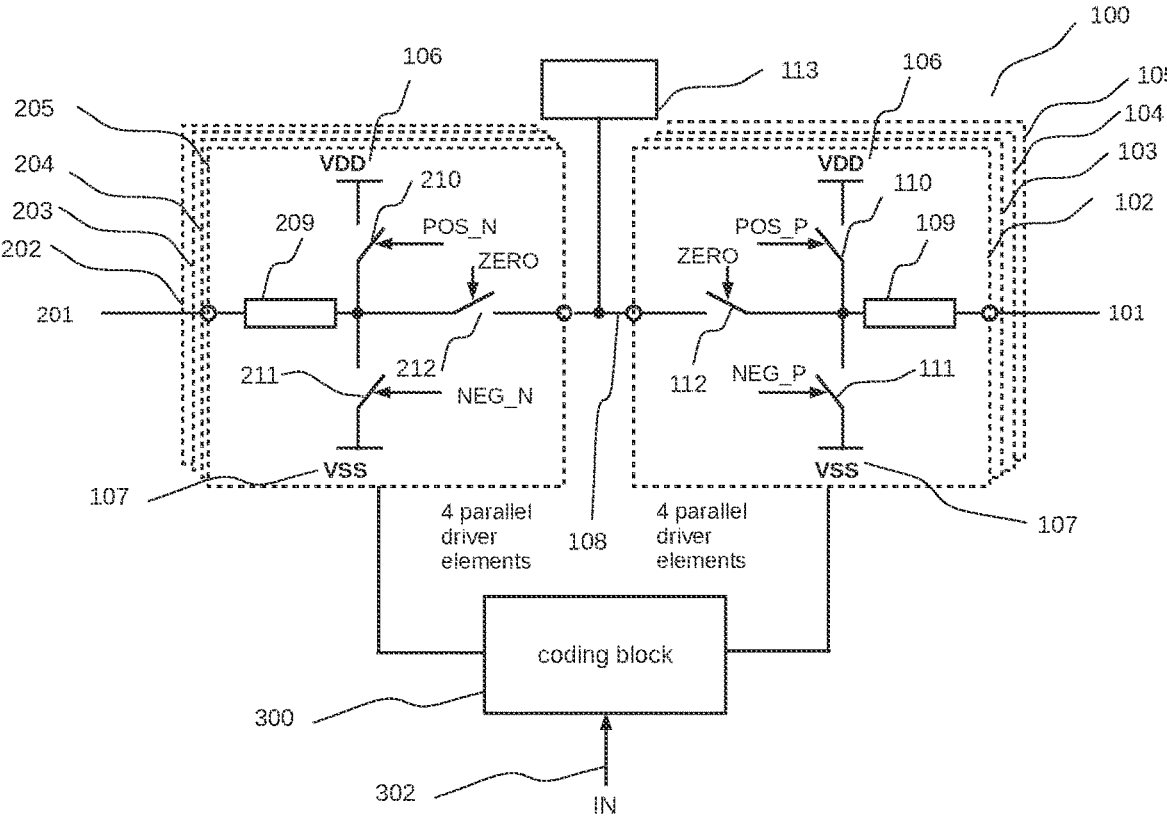

signal of the multi-mode line driver circuit is coded according to a communication standard.

20 Claims, 7 Drawing Sheets

(51) Int. Cl.
   H04L 25/03          (2006.01)
   H04L 25/49          (2006.01)

(56)                References Cited

U.S. PATENT DOCUMENTS 6,919,742  B1      7/2005   McGlinchey
   8,222,925  B2      7/2012   Li et al.
   8,446,173  B1      5/2013   Faucher et al.
   8,446,184  B2      5/2013   Van Der Goes et al.
   8,607,957  B2     12/2013   Blake et al.
   9,948,293  B1 *    4/2018   Lau .................... H03K 17/6872
  10,985,759  B2 *    4/2021   den Besten .... H03K 19/018514
2007/0121716  A1 *    5/2007   Nagarajan ........... H03M 1/0682
                                                        375/295
2009/0212829  A1      8/2009   Kan et al.
2009/0237122  A1      9/2009   Wenske et al.
2012/0025800  A1 *    2/2012   Dettloff ............... H04L 25/0272
                                                        323/299
2013/0057321  A1      3/2013   Rao
2015/0155875  A1 *    6/2015   Wada ............. H03K 19/018514
                                                        327/108
2020/0162290  A1 *    5/2020   Ramirez ............. H04L 25/0278

OTHER PUBLICATIONS

Hossein Ghafarian et al., "Impedance Calibration Technique Canceling Process and Temperature Variation in Source Terminated DAC Drivers in 22 nm FDSOI," 2019 IEEE 62nd International Midwest Symposium on Circuits and Systems (MWSCAS) Aug. 2019, pp. 113-116.

* cited by examiner

| Symbol | Symbol code in[1:0] | POS_P[3:0] | NEG_P[3:0] | ZERO_P[3:0] | POS_N[3:0] | NEG_N[3:0] | ZERO_N3:0] |
|---|---|---|---|---|---|---|---|
| 0 | 11(Constant Power) | {1,0,0,0} | {0,1,0,0} | {0,0,1,1} | {0,1,0,0} | {1,0,0,0} | {0,0,1,1} |
| 0 | 00(Low Power) | {0,0,0,0} | {0,0,0,0} | {1,1,1,1} | {0,0,0,0} | {0,0,0,0} | {1,1,1,1} |
| +1 | 10 | {1,1,1,1} | {0,0,0,0} | {0,0,0,0} | {0,0,0,0} | {1,1,1,1} | {0,0,0,0} |
| -1 | 01 | {0,0,0,0} | {1,1,1,1} | {0,0,0,0} | {1,1,1,1} | {0,0,0,0} | {0,0,0,0} |

Fig. 8

| Symbol | Symbol code in[1:0] | POS_P[3:0] | NEG_P[3:0] | ZERO_P[3:0] | POS_N[3:0] | NEG_N[3:0] | ZERO_N3:0] |
|---|---|---|---|---|---|---|---|
| 0 | 11(Constant Power) | {1,0,0,0} | {0,1,0,0} | {0,0,1,1} | {0,1,0,0} | {1,0,0,0} | {0,0,1,1} |
| 0 | 00(Low Power) | {0,0,0,0} | {0,0,0,0} | {1,1,1,1} | {0,0,0,0} | {0,0,0,0} | {1,1,1,1} |
| +0.5 | 10 | {1,1,0,0} | {0,0,0,0} | {0,0,1,1} | {0,0,0,0} | {1,1,0,0} | {0,0,1,1} |
| -0.5 | 01 | {0,0,0,0} | {1,1,0,0} | {0,0,1,1} | {1,1,0,0} | {0,0,0,0} | {0,0,1,1} |

Fig. 9

| Symbol | Symbol code in[1:0] | POS_P[3:0] | NEG_P[3:0] | ZERO_P[3:0] | POS_N[3:0] | NEG_N[3:0] | ZERO_N3:0] |
|---|---|---|---|---|---|---|---|
| 0 | 00(max common mode stability) | {1,1,0,0} | {0,0,1,1} | {0,0,0,0} | {0,0,1,1} | {1,1,0,0} | {0,0,0,0} |
| +0.5 | 10 (strong common mode) | {1,1,1,0} | {0,0,0,1} | {0,0,0,0} | {0,0,0,1} | {1,1,1,0} | {0,0,0,0} |
| -0.5 | 01 (strong common mode) | {0,0,0,1} | {1,1,1,0} | {0,0,0,0} | {1,1,1,0} | {0,0,0,1} | {0,0,0,0} |

Fig. 10

MULTI-MODE LINE DRIVER CIRCUIT FOR THE PHYSICAL LAYER OF A NETWORK CONNECTION, PARTICULARLY OF AN ETHERNET COMMUNICATION, SUPPORTING DIFFERENT SIGNAL LEVELS FOR DIFFERENT COMMUNICATION STANDARDS

CROSS REFERENCE TO RELATED APPLICATIONS

This application is the National Phase filing under 35 U.S.C. § 371 of International Application No PCT/EP2021/079422, filed Oct. 22, 2021, which claims priority to European Application No.: 20204078.8, filed on Oct. 27, 2020. The contents of this prior application is hereby incorporated by reference herein in its entirety.

The invention relates to a multi-mode line driver circuit for the physical layer of a network connection, particularly of an Ethernet communication, supporting different signal levels for different communication standards.

BACKGROUND

The invention is in the field of line driver circuits, as for example used in Ethernet physical layer (PHY) circuits. The main intention of this invention is to improve multi-mode line drivers, which can support different Ethernet communication standards, with respect to small silicon area and low power consumption. In the state of the art, multi-mode line drivers are realized by implementation of separate dedicated drivers and selection of one active driver during operation.

In the state of the art according to U.S. Pat. Nos. 8,607,957 B2, 6,665,347 B2, 6,919,742 B2 or 8,446,184 B2 a combination of dedicated current-mode and voltage mode line driver circuits is used to support multiple signaling standards. For high (full) swing a voltage driver is used and for lower swing the resistors inside the driver are connected to supply (VDD) or ground level (VSS) and current sources modulate the output signal. The usage of current sources has the general disadvantage, that current mode drivers are less energy efficient. Additionally, a well-defined (even calibrated) reference current is required making the design more complex. Current mode drivers are less robust with respect to Electromagnetic Compatibility (EMC) requirements.

In the state of the art according to U.S. Pat. No. 8,222,925 B2 or US 2009/0212829 A1 a multi-mode line driver is realized by a current mode driver that can provide different voltage levels by applying different current levels. This driver topology is less energy efficient than a voltage mode driver. U.S. Pat. No. 8,222,925 B2 and US 2009/0212829 A1 use different resistors for the different driver modes, which makes it necessary to compensate the variation on each resistor separately, which increases the circuit overhead for calibration.

Pursuant to U.S. Pat. No. 6,867,618 B2 a voltage driver with variable supply voltage is used, where the supply voltage is varied to support different output voltages. This has the drawback that a programmable supply voltage is required.

In "Impedance Calibration Technique Canceling Process and Temperature Variation in Source Terminated DAC Drivers in 22 nm FDSOI" by Hossein Ghafarian; Helia Ordouei and Friedel Gerfers a line driver resistor calibration for independent positive and negative line driver branches is shown. This way both branches need to be calibrated individually due to mismatch and therefore double the area is needed for resistors and the corresponding calibration circuits. Additionally, the current through resistors is not DC free, which causes faster ageing.

US 2009/0237122 A1 discloses a segment wise voltage mode driver with feedback, where each driver has a single output resistor. This topology can only support a single standard (voltage swing) and is not configurable to support multiple standards.

It is therefore an object of the present invention to improve a multi-mode line driver circuit by:

the realization of a multi-mode voltage-mode driver that supports different signal levels for different Ethernet standards but shows the same output resistance for these different standards;

multiple standards should use the same, single supply network, for power supply effort reduction;

the realization of a multi-mode voltage-mode driver with small silicon area, by means or re-use of circuit components for the different standards; and the reuse of existing resistor calibration schemes.

SUMMARY OF THE INVENTION

According to the present invention the object is solved by a multi-mode line driver circuit for the physical layer of a network connection, particularly of an Ethernet communication, supporting different signal levels for different communication standards, comprising:

at least one output for the network connection, at least two driver elements connected in parallel to the at least one output, wherein each driver element is connected to a positive supply voltage and a negative supply voltage, wherein each driver element comprises a resistor, a first switch and a second switch, wherein the resistor is connected with a first terminal to the output of the multi-mode line driver circuit and with the second terminal via the first switch to the positive supply voltage and via the second switch to the negative supply voltage, at least one coding block comprising an input for a digital signal to be transmitted over the network connection, wherein the coding block provides control signals for the first switch and the second switch of each of the at least two driver elements for connecting the resistor of each driver element either to the positive supply voltage or the negative supply voltage, thereby coding the digital signal at the input to an output signal at the output of the multi-mode line driver circuit according to a communication standard.

According to the present invention the multi-mode line driver circuit comprises at least two driver elements, which are connected in parallel to the output of the multi-mode line driver circuit. Thus, the at least two driver elements together define the output of the multi-mode line driver circuit. Each driver element is connected to a positive supply voltage and a negative supply voltage. Each driver element can connect either the positive voltage supply or the negative voltage supply to the output of the multi-mode line driver circuit via a resistor. Thus, the output of the multi-mode line driver is defined by the combination of the resistors of all driver elements connected to the output and the respective voltage connected to the output by each driver element. The resistor of each driver element is connected to the positive supply voltage or the negative supply voltage by a first switch respectively a second switch. The code symbols supported by the multi-mode line driver circuit therefore depends on the number of driver elements and the respective positive and negative supply voltages of the driver elements.

Although the invention refers to a positive supply voltage and a negative supply voltage it is also possible to adjust the ground level voltage so that both supply voltages supply a positive voltage with different levels.

The multi-mode line driver according to the invention further comprises at least one coding block with an input for a digital signal to be transmitted over the network connection using a particular communication standard. The at least one coding block provides control signals to the first and second switches of the at least two driver elements, for selectively connecting either the positive supply voltage or the negative supply voltage of each driver element to the output of the multi-mode line driver circuit through a resistor. In this way the coding block can encode the digital signals received at the input to a coded signal stream at the output of the multi-line driver circuit using the particular communication standard.

Thereby, the present invention solves above objects and overcomes the disadvantages of prior art multi-mode line drivers.

In a preferred variant of the invention each driver element is additionally connected to a common mode node and comprises a third switch, which connects the second terminal of the resistor to the common mode node and wherein the coding block additionally provides control signals for the third switch of each driver element for connecting the resistor of each driver element to the common mode node. The common mode node provides a third supply voltage, which is different from the positive supply voltage and the negative supply voltage to each driver element. Thus, each driver element can support three different voltages to the output of the multi-mode line driver circuit, thereby increasing the number of different data symbols at the output of the multi-mode line driver circuit. Thus, the number of supported communication standards is increased.

Pursuant to a particularly preferred variant of the invention all driver elements use a common positive supply voltage, a common negative supply voltage and/or a common mode node voltage supply. Thus, the number of necessary supply voltage circuits is reduced to a minimum, i.e. a circuit providing the positive supply voltage, a circuit providing the negative supply voltage and optionally a circuit providing the common mode node voltage.

According to a variant of the invention the multi-mode line driver circuit is a differential multi-mode line driver circuit with a positive output and a negative output for the network connection, wherein the negative output provides an inverted signal of the positive output. The differential multi-mode line driver circuit comprising at least two driver elements for each of the positive output and the negative output, wherein the driver elements connected to the negative output provide inverted signals of the driver elements connected to the positive output. Preferably, the at least one coding block operates the first switch, the second switch and/or the third switch of corresponding driver elements of the positive output and the negative output counter-pairwise, to provide the inverted output signals.

In a variant of the invention the at least one coding block generates a PAM3 signal with full or half amplitude or PAM5 signal at the output of the multi-mode line driver circuit based on the digital signal at the input of the coding block.

Generally, according to the invention multiple driver elements are connected, that enable a multi-level pulse amplitude modulation scheme (PAMx).

Pursuant to an advantageous variant of the invention the multi-mode line driver circuit comprises multiple coding blocks and one or more multiplexer, wherein each of the multiple coding blocks can generate an output signal according to a certain communication standard and the one or more multiplexer select the signals of the coding block providing the currently desired communication standard. Each of the multiple coding blocks is designed to provide a particular output according to a particular communication protocol at the output of the multi-mode line driver circuit based on the digital signal at the input. Each coding block therefore creates control signals for the first switch, the second switch and/or the third switch. One or more multiplexer are used to forward the control signals of that coding block to the first switch, the second switch and/or the third switch that provides the desired output. The one or more multiplexer are for example controlled by a code select signal.

According to a variant of the invention the coding block implements a slew rate control scheme, particularly for power-spectral-density shaping. Thus, the coding block can adjust the rising and/or falling edges of the code symbols generated at the output of the multi-mode line driver circuit. A Slew rate control scheme, based on elementwise switching (e.g. moving average length N) for power-spectral-density (PSD) shaping, in case the decoding circuit is overclocked, can output multiple different codes per data symbol to be sent. This allows for reducing high frequency components in the power-spectral-density (PSD) with robust digital filter scheme. The output is calculated from weighted input and previous weighted inputs. One example is a moving average filter or a raised cosine to suppress higher frequency components. A possible implementation for moving average is to delay the input for element N by N cycles. For a filter in z transform with $$\frac{\text{out}}{\text{in}} = \frac{1}{4} + \frac{z^{-1}}{2} + \frac{z^{-2}}{4},$$

quarter of the elements get the input signal, half get the input signal delayed by one cycle and the rest by two cycles. Finer resolution is possible for higher number of parallel driver elements.

In a particular preferred variant of the invention the multi-mode line driver circuit comprises multiple instances of the at least two driver elements, which are connected in parallel to the at least one output, wherein each of the multiple instances of the at least two driver elements can be enabled or disabled by a control circuit. The instances of the at least two driver elements according to the present invention refer to at least two instances of each of the at least two driver elements. In this variant not all of the multiple instances of the at least two driver elements must be active to generate the supported communication standards. By selecting a subset of the multiple instances of the at least two driver elements resistance variations in process voltage and temperature can be compensated.

Pursuant to a variant of the invention the control circuit enables a subset of the multiple instances of the at least two driver elements to provide a certain output resistance at the output of the multi-node line driver circuit. By combining a subset of the multiple instances of the at least two driver elements a certain output resistance can be provided. In case of a differential multi-mode line driver circuit the output resistance of the negative output and of the positive output are equal. A calibration scheme can be used, e.g. where a reference resistance is compared to a replica resistor element of the instances of the at least two driver elements or any other calibration scheme. Depending on the variation different number of instances of the at least two driver elements can be selected. The more instances of the at least two driver elements are available the finer granular resistance can be selected.

According to a variant of the invention one or more of the multiple instances of the at least two driver elements are enabled by providing one or more AND-logic gates combining the control signal of the first switch, the second switch or the third switch of the instance of the driver element with a respective enable signal.

In a further variant of the invention one or more of the multiple instances of the at least two driver elements are enabled by additional switches in series with the first switch, the second switch and/or third switch of the instance of the driver element. It is also possible to combine and or mix the AND-logic gates and additional switches in an instance of a driver element for enabling/disabling the instance of the driver element.

Pursuant to an advantageous variant of the invention one or more of the instances of the at least two driver elements comprise a first additional switch in series with the first switch and a second additional switch in series with second switch, wherein the first additional switch is arranged between the resistor of the instance of the driver element and the first switch and the second additional switch is arranged between the resistor of the instance of the driver element and the second switch, and wherein the third switch is connected with one end to the common mode node and with the other end to the connection between the first switch and the first additional switch and additionally to the connection between the second switch and the second additional switch. Particularly, the third switch is implemented by two separate switches, wherein the first separate switch is connected with one end to the common mode node and with the other end to the connection between the first switch and the first additional switch and second separate switch is connected with one end to the common mode node line and with the other end to the connection between the second switch and the second additional switch. Such an instance of the driver element can be easily implemented by MOS-FET transistors as switches, wherein the first additional switch and the second additional switch are implemented by a CMOS-transfer-gate.

According to a variant of the invention the resistor of each of the instances of the at least two driver elements has at least partially a different resistance. By providing instances of driver elements with different resistors the output resistance of the multi-mode line driver circuit can be defined more accurately.

In a variant of the invention the first switch, the first additional switch, the second switch, the second additional switch, the third switch, the first separate switch and/or the second separate switch comprise a MOS transistors.

BRIEF DESCRIPTION OF THE DRAWING FIGURES

Figure 2:
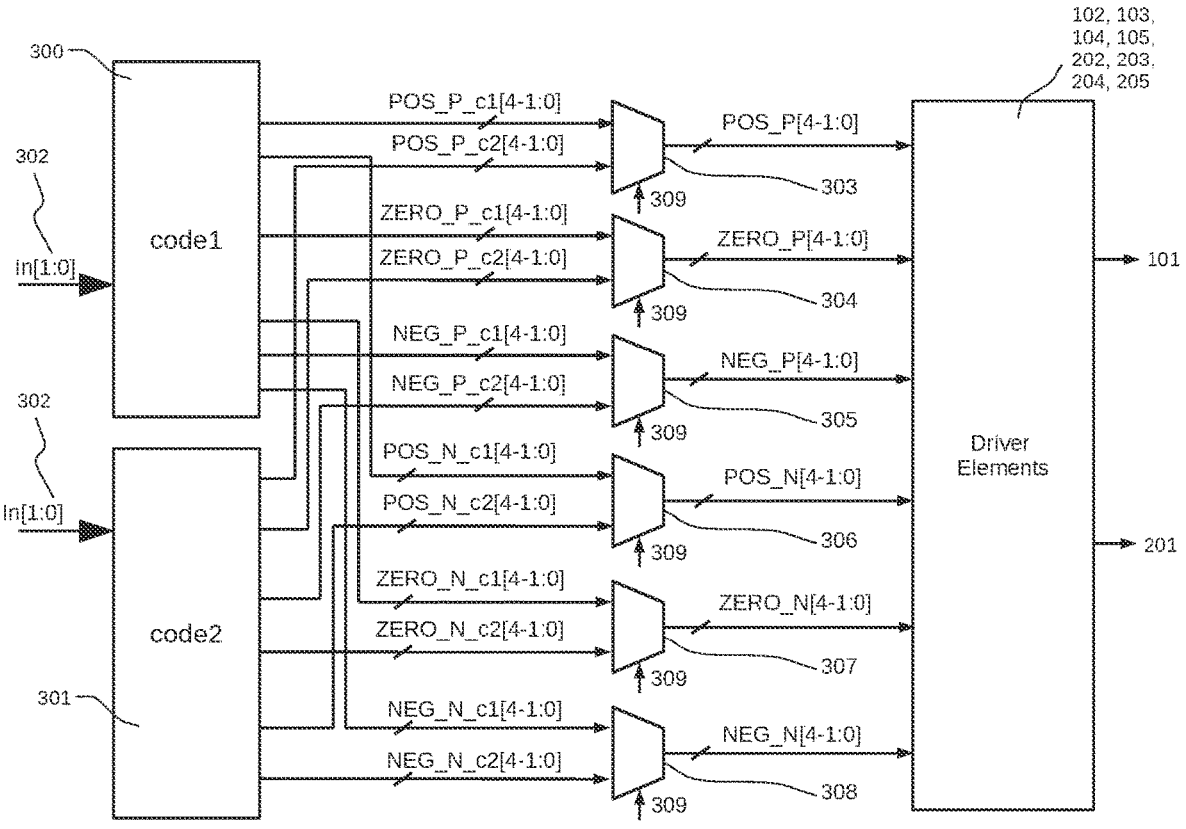
Figure 3:
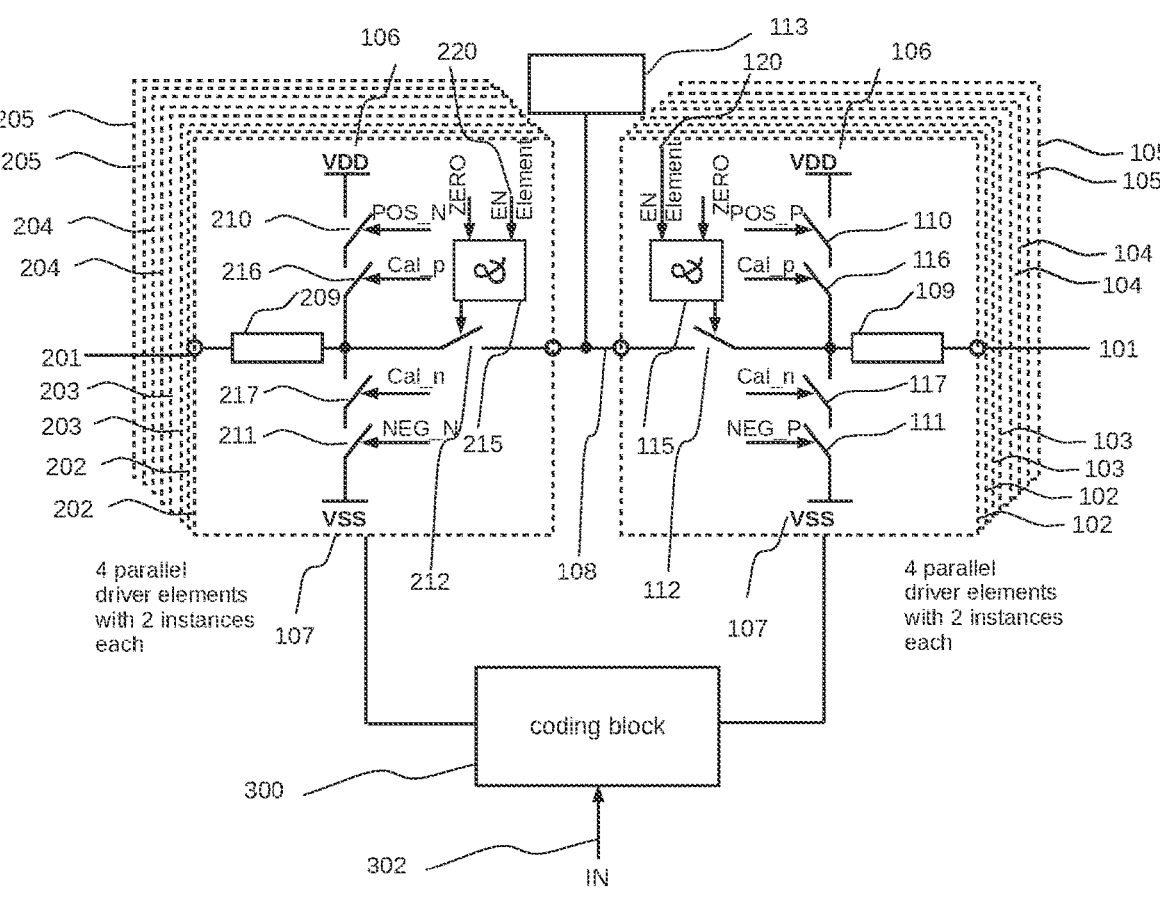
Figure 4:
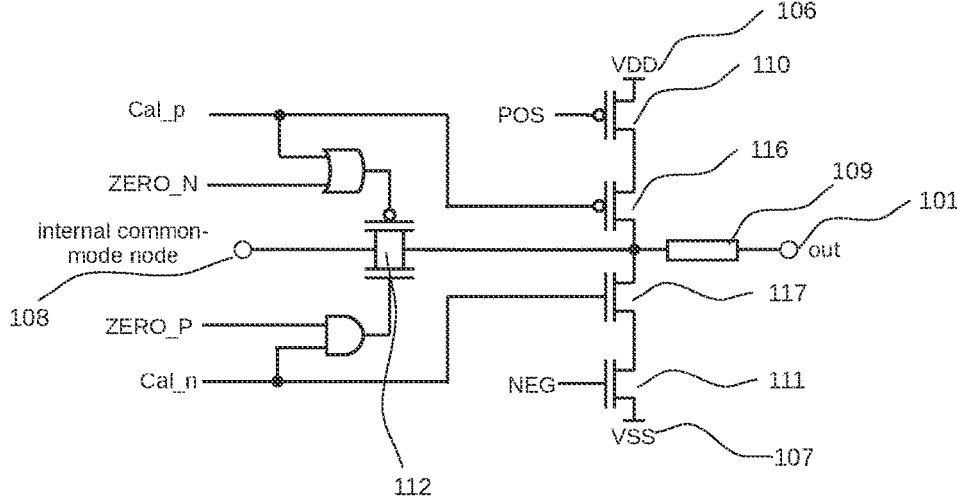
Figure 5:
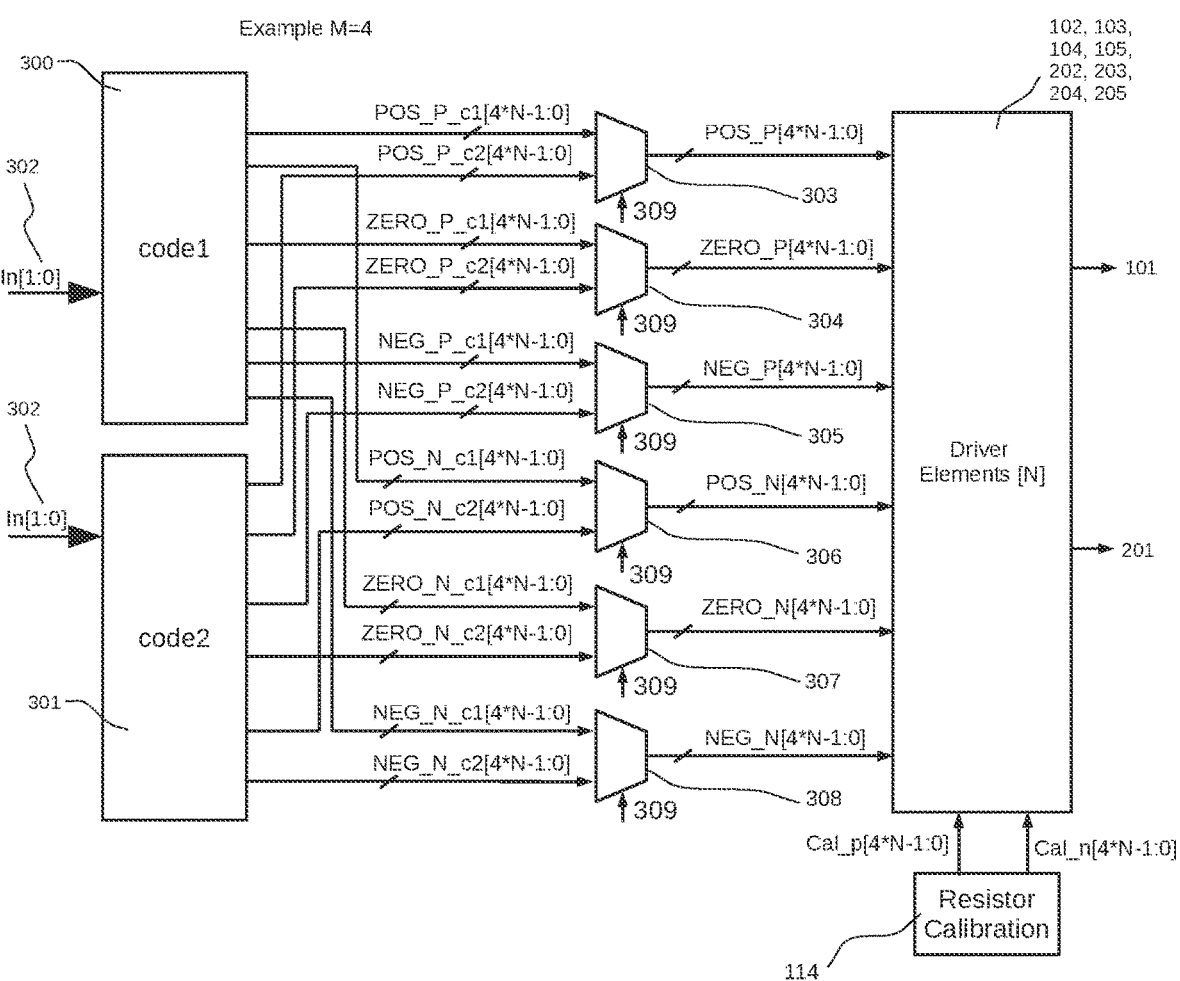
Figure 6:
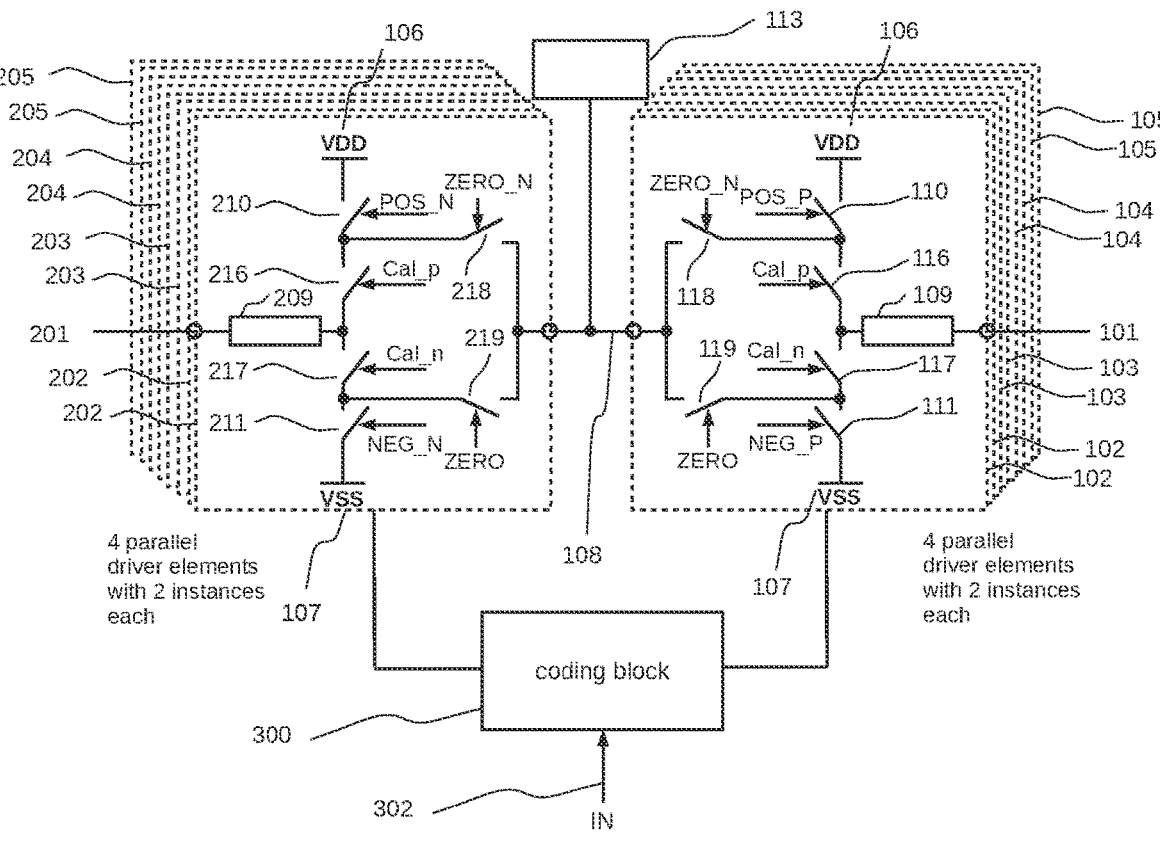
Figure 7:
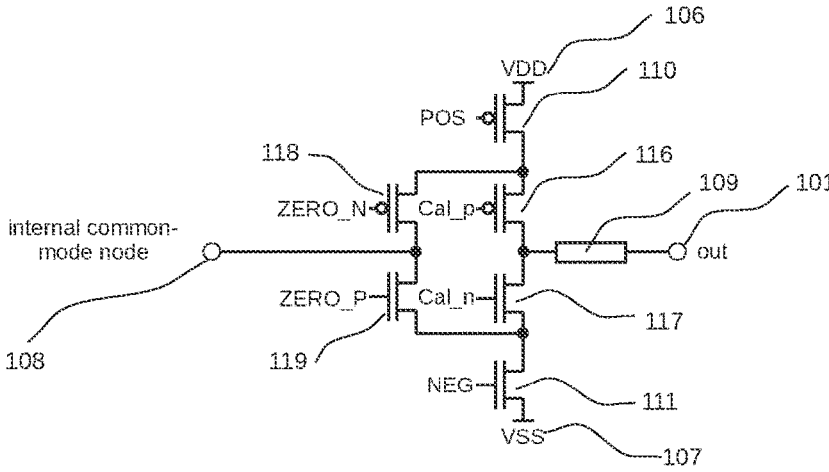
Figure 11:
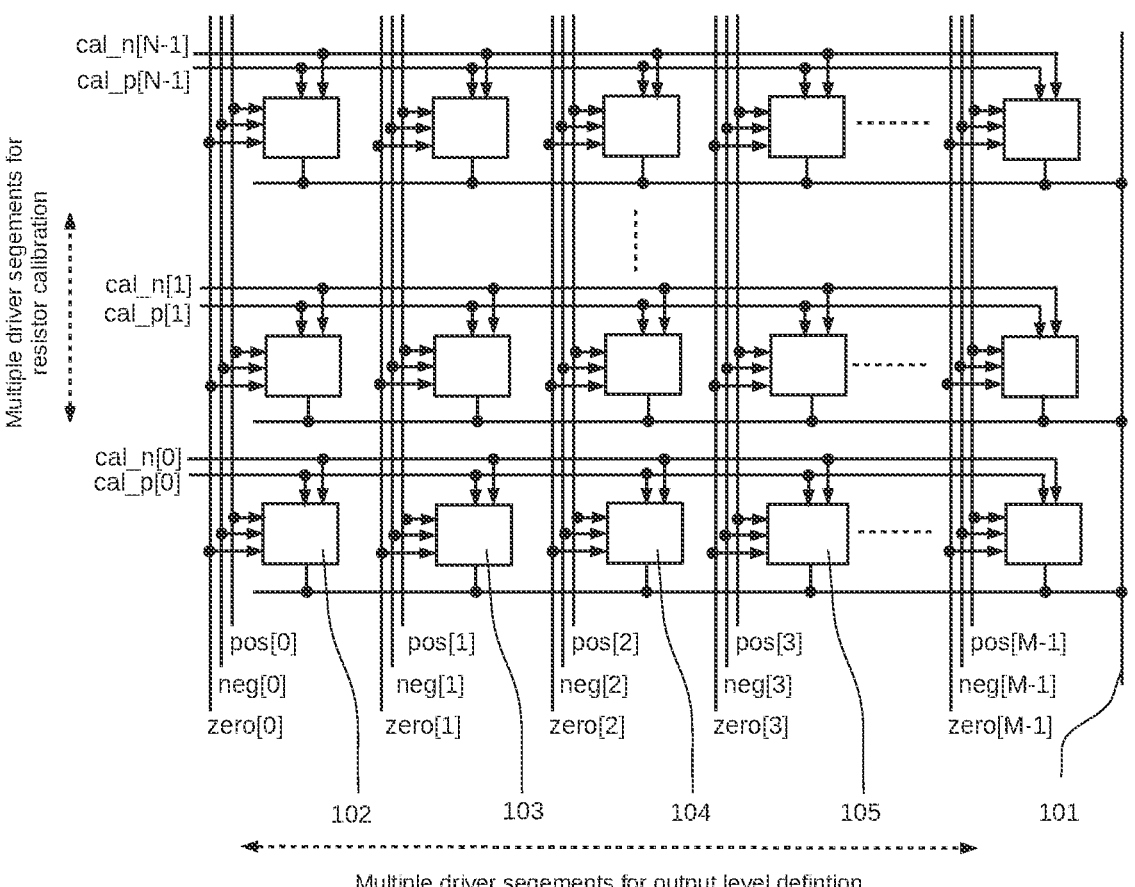

In the following the invention will be further explained with respect to embodiments shown in the figures. It shows:

FIG. 1 a schematic view of a first embodiment of a multi-mode line driver circuit according to the invention, FIG. 2 a schematic view of a first embodiment of coding blocks connected to driver elements in a multi-mode line driver circuit according to the invention, FIG. 3 a schematic view of a second embodiment of a multi-mode line driver circuit according to the invention, FIG. 4 a circuit diagram of a first embodiment of a driver element used in a multi-mode line driver circuit according to the invention, FIG. 5 a schematic view of a second embodiment of coding blocks connected to driver elements in a multi-mode line driver circuit according to the invention, FIG. 6 a schematic view of a third embodiment of a multi-mode line driver circuit according to the invention, FIG. 7 a circuit diagram of a second embodiment of a driver element used in a multi-mode line driver circuit according to the invention, FIG. 8 input output coding scheme with full level swing of driver, two codings of zero symbol, with constant power or low power (floating common mode), FIG. 9 input output coding scheme with half level swing of driver, two codings of zero symbol, with constant power or low power (floating common mode), FIG. 10 input put coding of zero symbol for half level swing, and FIG. 11 a schematic view of M multiple instances of driver elements.

FIG. 1 shows a schematic view of a first embodiment of a multi-mode line driver circuit 100 for the physical layer of a network connection, particularly of an Ethernet communication, supporting different signal levels for different communication standards according to the invention. The multi-mode line driver circuit 100 shown in FIG. 1 is a differential multi-mode line driver circuit 100 with a positive output 101 and a negative output 201 for the network connection, wherein the negative output 201 provides an inverted signal of the positive output 101.

DETAILED DESCRIPTION

The differential multi-mode line driver circuit 100 comprises four driver elements 102, 103, 104, 105 connected in parallel to the positive output 101 and four driver elements 202, 203, 204, 205 connected in parallel to the negative output 201 and providing an inverted output signal of the positive output 101. Each driver element 102, 103, 104, 105, 202, 203, 204, 205 is connected to a positive supply voltage 106, a negative supply voltage 107 and a common mode node 108. Furthermore, each driver element 102, 103, 104, 105, 202, 203, 204, 205 is comprises a resistor 109, 209, a first switch 110, 210, a second switch 111, 211 and a third switch 112, 212. The resistor 109, 209 is connected with a first terminal to the positive respectively negative output 101, 201 of the differential multi-mode line driver circuit 100 and with the second terminal via the first switch 110, 210 to the positive supply voltage 106, via the second switch 111, 211 to the negative supply voltage 107 and via the third switch 112, 212 to the common mode node 108.

The differential multi-mode line driver circuit 100 further comprises at least one coding block 300, 301 comprising an input 302 for a digital signal to be transmitted over the network connection. The coding block 300, 301 provides control signals for the first switch 110, 210, the second switch 111, 211 and the third switch 112, 212 of each of the driver elements 102, 103, 104, 105, 202, 203, 204, 205 for connecting the resistor 109, 209 of each driver element 102, 103, 104, 105, 202, 203, 204, 205 either to the positive supply voltage 106, the negative supply voltage 107 or the common mode node 108. Thereby, the digital signal at the input 302 is coded to an output signal at the positive and negative output 101, 201 of the differential multi-mode line driver circuit 100 according to a communication standard.

According to the first embodiment shown in FIG. 1 all driver elements 102, 103, 104, 105, 202, 203, 204, 205 use a common positive supply voltage 106, a common negative supply voltage 107 and a single common mode node voltage supply 113.

Since FIG. 1 shows a differential multi-mode line driver circuit 100 the at least one coding block 300, 301 operates the first switch 110, 210, the second switch 111, 211 and the third switch 112, 212 of corresponding driver elements 102, 103, 104, 105, 202, 203, 204, 205 of the positive output 101 and the negative output 201 counter-pairwise, to provide inverted output signals at the positive output 101 and the negative output 201.

FIG. 2 shows a schematic view of a first embodiment of two coding blocks 300, 301 connected to driver elements 102, 103, 104, 105, 202, 203, 204, 205 in a multi-mode line driver circuit 100 according to the invention. Particularly, the embodiment shown in FIG. 2 can be used with the differential multi-mode line driver circuit 100 shown in FIG. 1.

According to FIG. 2 the multi-mode line driver circuit 100 comprises two coding blocks 300, 301, each receiving the same input signal at the respective input 302. As explained with respect to FIG. 1 the coding blocks 300, 301 provide control signals for the first switch 110, 210, the second switch 111, 211 and the third switch 112, 212 of each of the driver elements 102, 103, 104, 105, 202, 203, 204, 205 for connecting the resistor 109, 209 of each driver element 102, 103, 104, 105, 202, 203, 204, 205 either to the positive supply voltage 106, the negative supply voltage 107 or the common mode node 108. Thereby, the digital signal at the input 302 is coded to an output signal at the positive and negative output 101, 201 of the differential multi-mode line driver circuit 100 according to a communication standard. The two coding blocks 300, 301 are implemented to provide output signals at the positive and negative output 101, 201 according to different communication standards. For example, a coding block 300, 301 can generate PAM3 signal with full or half amplitude or PAM5 signal at the output 101, 201 of the multi-mode line driver circuit 100 based on the digital signal at the input 302 of the coding block 300, 301.

The multi-mode line driver circuit 100 comprises multiple multiplexer 303, 304, 305, 306, 307, 308 to select the signals of the coding block 300, 301 providing the currently desired communication standard. According to the embodiment shown in FIG. 2 the multiplexer 303, 304, 305, 306, 307, 308 can switch between the control signals for the first switch 110, 210, the second switch 111, 211 and the third switch 112, 212 of each of the driver elements 102, 103, 104, 105, 202, 203, 204, 205. The multiplexer 303, 304, 305, 306, 307, 308 are operated by a code select signal 309 to switch between the desired control signals for the first switch 110, 210, the second switch 111, 211 and the third switch 112, 212 of each of the driver elements 102, 103, 104, 105, 202, 203, 204, 205.

FIG. 3 shows a schematic view of a second embodiment of a multi-mode line driver circuit 100 according to the invention. According to this embodiment the four driver elements 102, 103, 104, 105 connected to the positive output 101 respectively the four driver elements 202, 203, 204, 205 connected to the negative output 201 each comprise multiple instances of the respective driver element 102, 103, 104, 105, 202, 203, 204, 205. In the shown embodiment of FIG. 3 the multi-mode line driver circuit 100 comprises two instances of each driver element 102, 103, 104, 105, 202,

203, 204, 205, wherein the two instances of a driver element 102, 103, 104, 105, 202, 203, 204, 205 are indicated by the same reference numeral. The instances of the driver elements 102, 103, 104, 105, 202, 203, 204, 205 are connected in parallel to the positive output 101 respectively the negative output 2021. Each of the multiple instances of each driver element 102, 103, 104, 105, 202, 203, 204, 205 can be enabled or disabled by a control unit 114. Particularly, a subset of the instances of the multiple driver elements 102, 103, 104, 105, 202, 203, 204, 205 can be selected to compensate variations in process voltage and temperature and/or to provide a certain output resistance at the output 101, 201 of the differential multi-mode line driver circuit 100.

The instances of the driver elements 102, 103, 104, 105, 202, 203, 204, 205 are enabled or disabled by a respective enable/disable signal 120, 220, for example generated by the control circuit 114 (not shown in FIG. 3).

According to the embodiment shown in FIG. 3 the control signal for the third switch 112, 212 is combined by an AND-logic gate 115, 215 with the enable/disable signal 120, 220 of the control circuit 114. Thus, the third switch 112, 212 of an instance of a driver element 102, 103, 104, 105, 202, 203, 204, 205 is only closed if the control signal for the third switch 112, 212 and the enable/disable signal 120, 220 for that instance of the respective driver element 102, 103, 104, 105, 202, 203, 204, 205 provide a positive control signal. The third switches 112, 212 of all other instances of the respective driver element 102, 103, 104, 105, 202, 203, 204, 205 remain open.

As further shown in FIG. 3 the driver elements 102, 103, 104, 105, 202, 203, 204, 205 further comprise a first additional switch 116, 216 in series with the first switch 110, 210 and a second additional switch 117, 217 in series with second switch 111, 211. The first additional switch 116, 216 is arranged between the resistor 109, 209 of the instances of the driver elements 102, 103, 104, 105, 202, 203, 204, 205 and the first switch 110, 210 and the second additional switch 117, 217 is arranged between the resistor 109, 209 of the instances of the driver elements 102, 103, 104, 105, 202, 203, 204, 205 and the second switch 111, 211. The first additional switch 116, 216 and the second additional switch 117, 217 are operated by the enable/disable signal 120, 200. Thus, the output 101,201 of an instance of the respective driver element 102, 103, 104, 105, 202, 203, 204, 205 is only connected to the positive supply voltage 106 if the first switch 110, 210 and the first additional switch 116, 216 are closed, wherein the first additional switch 116, 216 is operated by the enable/disable signal 120, 220. Respectively, the output 101,201 of an instance of the driver element 102, 103, 104, 105, 202, 203, 204, 205 is only connected to the negative supply voltage 107 if the second switch 111, 211 and the second additional switch 117, 217 are closed, wherein the second additional switch 117, 217 is operated by the enable/disable signal 120, 220.

FIG. 4 shows a circuit diagram of a first embodiment of a driver element 102, 103, 104, 105, 202, 203, 204, 205 used in a multi-mode line driver circuit 100 according to the invention. The circuit diagram of the driver elements 102, 103, 104, 105, 202, 203, 204, 205 shown in FIG. 4 corresponds to the driver elements 102, 103, 104, 105, 202, 203, 204, 205 used in the differential multi-mode line driver circuit 100 shown in FIG. 3. The inner terminal of the resistor 109 is connected to the common mode node 108 by a switch 112 which is realized as CMOS transfer gate, consisting of a NMOS and a PMOS transistor connected in parallel. This connection to the common mode node 108 is established if the control signal for the third switch 112 (ZERO signal) is activated and the instance of driver element is enabled (selected). This is realized by an AND connection of ZERO_P and Cal_n driving the gate of the NMOS of 112 and by an OR connection of ZERO_N and Cal_p, driving the gate of the PMOS of 112.

FIG. 5 shows a schematic view of a second embodiment of coding blocks 300, 301 connected to multiple instances of driver elements 102, 103, 104, 105, 202, 203, 204, 205 in a multi-mode line driver circuit 100 according to the invention. The second embodiment of coding blocks 300, 301 connected to driver elements 102, 103, 104, 105, 202, 203, 204, 205 shown in FIG. 5 differs from the first embodiment of coding blocks 300, 301 connected to driver elements 102, 103, 104, 105, 202, 203, 204, 205 shown in FIG. 2 in that there is a control circuit 114 for enabling/disabling certain instances driver elements 102, 103, 104, 105, 202, 203, 204, 205. In this second embodiment according to FIG. 5 the multi-mode line driver circuit 100 comprises N parallel instances of each driver element 102, 103, 104, 105, 202, 203, 204, 205 connected in parallel to positive output 101, respectively the negative output 201, wherein each instance of the respective driver element 102, 103, 104, 105, 202, 203, 204, 205 can be enabled or disabled by the control circuit 114. The control circuit 114 enables a subset of the N instances for each driver element 102, 103, 104, 105, 202, 203, 204, 205 to provide a certain output resistance at the output 101, 201 of the multi-node line driver circuit 100. By combining a subset of the N instances of the driver elements 102, 103, 104, 105, 202, 203, 204, 205 a certain output resistance can be provided. In case of a differential multi-mode line driver circuit 100 the output resistance of the negative output 201 and of the positive output 101 are equal. A calibration scheme can be used, where a reference resistance is compared to a replica resistor element of the instance of a driver element 102, 103, 104, 105, 202, 203, 204, 205. Depending on the variation different number of instances of the driver elements 102, 103, 104, 105, 202, 203, 204, 205 can be selected. The more instances of each driver element 102, 103, 104, 105, 202, 203, 204, 205 are available the finer granular resistance can be selected.

FIG. 6 shows a schematic view of a third embodiment of a multi-mode line driver circuit 100 according to the invention, which differs from the second embodiment of the multi-mode line driver circuit 100 shown in FIG. 3 by the implementation of the third switch 112, 212. According to the third embodiment shown in FIG. 6 the third switch 112, 212 is implemented by two separate switches 118, 218, 119, 219. The first separate switch 118, 218 is connected with one end to the common mode node 108 and with the other end to the connection between the first switch 110, 210 and the first additional switch 116, 216 and second separate switch 119, 219 is connected with one end to the common mode node line 108 and with the other end to the connection between the second switch 111, 211 and the second additional switch 117, 217. A certain instance of a respective driver element 102, 103, 104, 105, 202, 203, 204, 205 can be enabled/disabled by the first additional switch 116, 216 or second additional switch 117, 217, which in combination with the first separate switch 118, 218 or second separate switch 119, 219 can connect the common mode line 108 to the positive output 101 respectively negative output 201. The positive supply voltage 106 and negative supply voltage 107 are connected to the positive output 101 respectively negative output 201 as already described above with respect to the second embodiment shown in FIG. 2. The third embodiment eliminates the AND-Logic gate 115, 215 of the second embodiment. Furthermore, it can be easily implemented by using MOS transistors, as shown in FIG. 7, wherein the first separate switch 118, 218 is implemented as PMOS transistor and the second separate switch 119, 219 is implemented as NMOS transistor, as shown in the circuit diagram of FIG. 7. In case of a CMOS realization, it eliminates the OR and AND gates as shown in FIG. 4.

FIG. 8 shows the coding for full level transmission. The coding translates the input symbol to the code applied to slices. In FIG. 9 the same coding for half level transmission is shown. For lower levels like half level it is possible to decrease common mode impedance by increasing the power. The coding for this scenario is shown in FIG. 10.

FIG. 11 shows the embodiment of the M multiple instances of a driver element 102, 103, 104, 105, 202, 203, 204, 205 for one of the differential output nodes 101, 201, where the first four driver elements referred to by reference numerals 102, 103, 104, 105, are for the purpose of generation of multiple output levels, as for example for PAM3, PAM5 or other multi-level schemes (PAMx). They are controlled by the POS, NEG and ZERO signals (control signals for the first switch 110, 210, second switch 211, 211, third switch 112, 212, first additional switch 116, 216, second additional switch 117, 218, first separate switch 118, 218 and/or second additional switch 119, 219) as shown in FIG. 8, FIG. 9 and FIG. 10 for the example of M=4. N-multiple instances of these driver elements 102, 103, 104, 105, 202, 203, 204, 205 are connected in parallel for the purpose of output resistance calibration by the calibration signals cal_p and cal_n of control circuit 114. In FIG. 11 all cells in a line get the same control signal. Another embodiment is to apply different calibration signals in one line and thus increase resistor resolution without the need of more elements.

LIST OF REFERENCE NUMERALS 100 multi-mode line driver circuit
101 output (positive)
102 driver element
103 driver element
104 driver element
105 driver element
106 positive supply voltage
107 negative supply voltage
108 common mode node
109 resistor
110 first switch
111 second switch
112 third switch
113 common mode voltage supply
114 control circuit
115 AND-logic gate
116 first additional switch
117 second additional switch
118 first separate switch
119 second separate switch
120 enable/disable signal
201 output (negative)
202 driver element
203 driver element
204 driver element
205 driver element
209 resistor
210 first switch
211 second switch
212 third switch

215 AND-logic gate
216 first additional switch
217 second additional switch
218 first separate switch
219 second separate switch
220 enable/disable signal
300 coding block
301 coding block
302 input
303 multiplexer
304 multiplexer
305 multiplexer
306 multiplexer
307 multiplexer
308 multiplexer
309 code select signal

The invention claimed is:

1. A multi-mode line driver circuit for the physical layer of a network connection, particularly of an Ethernet communication, supporting different signal levels for different communication standards, comprising:

at least one output for the network connection,
at least two driver elements connected in parallel to the at least one output, wherein each driver element is connected to a positive supply voltage and a negative supply voltage, wherein each driver element comprises a resistor, a first switch and a second switch, wherein the resistor is connected with a first terminal to the output of the multi-mode line driver circuit and with the second terminal via the first switch to the positive supply voltage and via the second switch to the negative supply voltage,
multiple coding blocks comprising an input for a digital signal to be transmitted over the network connection, wherein the coding blocks provide control signals for the first switch and the second switch of each of the at least two driver elements for connecting the resistor of each driver element either to the positive supply voltage or the negative supply voltage, thereby coding the digital signal at the input to an output signal at the output of the multi-mode line driver circuit according to a communication standard, and
one or more multiplexers, wherein each of the multiple coding blocks can generate an output signal according to a certain communication standard and the one or more multiplexers select the signals of the coding block providing the currently desired communication standard.

2. The multi-mode line driver circuit according to claim 1, wherein each driver element is additionally connected to a common mode node and comprises a third switch, which connects the second terminal of the resistor to the common mode node and wherein the coding block additionally provides control signals for the third switch of each driver element for connecting the resistor of each driver element to the common mode node.

3. The multi-mode line driver circuit according to claim 1, wherein all driver elements use a common positive supply voltage, a common negative supply voltage or a single common mode node voltage supply.

4. The multi-mode line driver circuit according to claim 1, wherein the multi-mode line driver circuit is a differential multi-mode line driver circuit with a positive output and a negative output for the network connection, wherein the negative output provides an inverted signal of the positive output, the differential multi-mode line driver circuit comprising at least two driver elements for each of the positive output and the negative output, wherein the driver elements connected to the negative output provide inverted signals of the driver elements connected to the positive output.

5. The multi-mode line driver circuit according to claim 4, wherein the at least one coding block operates the first switch, the second switch or the third switch of corresponding driver elements of the positive output and the negative output counter-pairwise.

6. The multi-mode line driver circuit according to claim 1, wherein the at least one coding block generates a PAM3 signal with full or half amplitude or PAM5 signal or other multi-level schemes (PAMx) at the output of the multi-mode line driver circuit based on the digital signal at the input of the coding block.

7. The multi-mode line driver circuit according to claim 1, wherein the coding block implements a slew rate control scheme, particularly for power-spectral-density shaping.

8. The multi-mode line driver circuit according to claim 1, comprising multiple instances of the at least two driver elements, wherein the multiple instances of the at least two driver elements are connected in parallel to the at least one output, wherein each of the multiple instances of the at least two driver elements can be enabled or disabled by a control circuit.

9. The multi-mode line driver circuit according to claim 8, wherein control circuit enables a subset of the multiple instances of the at least two driver elements to provide a certain output resistance at the output of the multi-node line driver.

10. The multi-mode line driver circuit according to claim 8, wherein one or more of the multiple instances of the at least two driver elements are enabled by providing one or more AND-logic gates combining the control signal of the first switch, the second switch or the third switch of the instance of the driver element with a respective enable signal.

11. The multi-mode line driver circuit according to claim 8, wherein one or more of the multiple instances of the at least two driver elements are enabled by additional switches in series with the first switch, the second switch or third switch of the instance of the driver element.

12. The multi-mode line driver circuit according to claim 11, wherein one or more of the multiple instances comprise a first additional switch in series with the first switch and a second additional switch in series with second switch, wherein the first additional switch is arranged between the resistor of the instance of the driver element and the first switch and the second additional switch is arranged between the resistor of the instance of the driver element and the second switch, and wherein the third switch is connected with one end to the common mode node and with the other end to the connection between the first switch and the first additional switch and additionally to the connection between the second switch and the second additional switch.

13. The multi-mode line driver circuit according to claim 12, wherein the third switch is implemented by two separate switches, wherein the first separate switch is connected with one end to the common mode node and with the other end to the connection between the first switch and the first additional switch and second separate switch is connected with one end to the common mode node line and with the other end to the connection between the second switch and the second additional switch.

14. The multi-mode line driver circuit according to claim 8, wherein the resistor of each of the multiple instances of the at least two driver elements has at least partially a different resistance.

15. The multi-mode line driver circuit according to claim 1, wherein the first switch, the first additional switch, the second switch, the second additional switch, the third switch, the first separate switch or the second separate switch comprise a MOS transistors.

16. The multi-mode line driver circuit according to claim 2, wherein all driver elements use a common positive supply voltage, a common negative supply voltage or a single common mode node voltage supply.

17. The multi-mode line driver circuit according to claim 16, wherein the multi-mode line driver circuit is a differential multi-mode line driver circuit with a positive output and a negative output for the network connection, wherein the negative output provides an inverted signal of the positive output, the differential multi-mode line driver circuit comprising at least two driver elements for each of the positive output and the negative output, wherein the driver elements connected to the negative output provide inverted signals of the driver elements connected to the positive output.

18. The multi-mode line driver circuit according to claim 17, wherein the at least one coding block operates the first switch, the second switch or the third switch of corresponding driver elements of the positive output and the negative output counter-pairwise.

19. The multi-mode line driver circuit according to claim 18, wherein the at least one coding block generates a PAM3 signal with full or half amplitude or PAM5 signal or other multi-level schemes (PAMx) at the output of the multi-mode line driver circuit based on the digital signal at the input of the coding block.

20. A multi-mode line driver circuit for the physical layer of a network connection, particularly of an Ethernet communication, supporting different signal levels for different communication standards, comprising:

at least one output for the network connection, at least two driver elements connected in parallel to the at least one output, wherein each driver element is connected to a positive supply voltage and a negative supply voltage, wherein each driver element comprises a resistor, a first switch and a second switch, wherein the resistor is connected with a first terminal to the output of the multi-mode line driver circuit and with the second terminal via the first switch to the positive supply voltage and via the second switch to the negative supply voltage, at least one coding block comprising an input for a digital signal to be transmitted over the network connection, wherein the coding block provides control signals for the first switch and the second switch of each of the at least two driver elements for connecting the resistor of each driver element either to the positive supply voltage or the negative supply voltage, thereby coding the digital signal at the input to an output signal at the output of the multi-mode line driver circuit according to a communication standard, wherein the first switch, a first additional switch, the second switch, a second additional switch, a third switch, a first separate switch or a second separate switch comprise a MOS transistor.

* * * * *